United States Patent Office 3,068,134
Patented Dec. 11, 1962

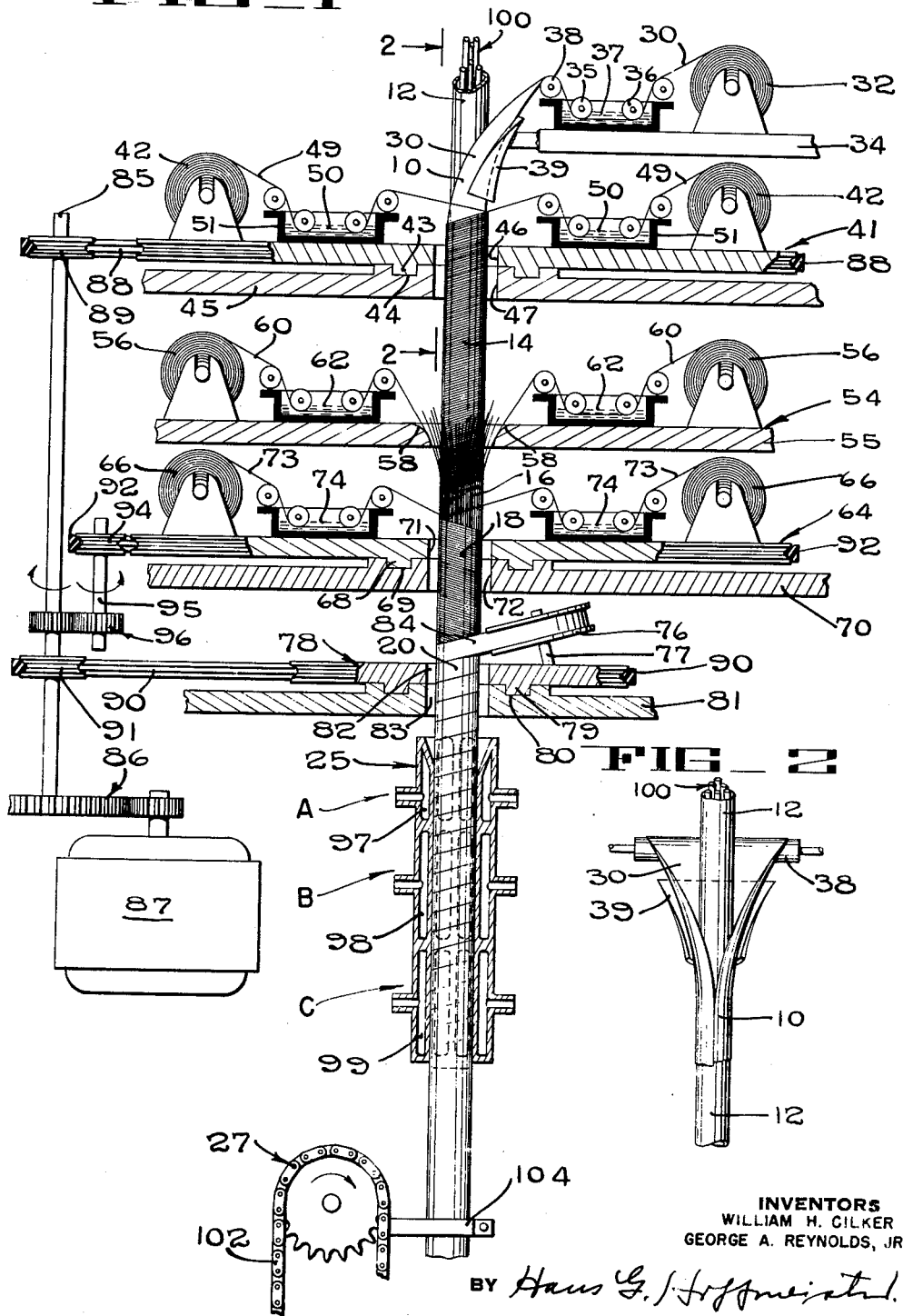

3,068,134
METHOD OF MAKING COMPOSITE PLASTIC PIPE OF REINFORCING GLASS FIBERS
William H. Cilker, Los Gatos, and George A. Reynolds, Jr., San Jose, Calif., assignors to FMC Corporation, a corporation of Delaware
Filed Apr. 26, 1954, Ser. No. 425,412
2 Claims. (Cl. 156—172)

This invention relates to improvements in reinforced plastic materials and processes for making the same, and more particularly pertains to a composite pipe made up of reinforcing glass fibers bonded together with a plastic binder and a method of making the same.

It is an object of the present invention to provide a lightweight plastic pipe suitable for conveying liquids under pressure.

Another object is to provide a composite pipe of plastic material that has sufficient strength in a transverse direction to resist bursting pressures and sufficient longitudinal strength to resist longitudinal tensile stresses and to prevent buckling in unsupported portions of a pipeline fabricated from lengths of said composite pipe.

Another object is to provide an improved pipe that is not subject to rusting or deterioration due to the passage therethrough of water or other liquids.

Another object is to provide a novel, efficient method of making reinforced plastic pipe.

Other and further objects and advantages will become apparent from the following description taken in connection with the accompanying drawings, in which:

FIG. 1 is a schematic vertical section of apparatus adapted to carry out the pipe-making process of the present invention.

FIG. 2 is an enlarged fragmentary elevation of a portion of the apparatus of FIG. 1, looking in the direction of arrows 2—2 of FIG. 1.

In accordance with the present invention, a tubular pipe is formed by applying a base layer 10 (FIG. 1) of glass fiber material, impregnated with liquid resin, to a stationary hollow cylindrical mandrel 12 and then applying consecutive superposed layers of resin-impregnated glass fiber material 14, 16, 18 and 20 over the base layer. The layers 10 and 20 are formed of resin-impregnated ribbons of glass fiber matting while the layers 14, 16 and 18 are formed of resin-impregnated continuous glass fiber roving. Both the matting and the roving are drawn from spools under a degree of tension sufficient to assure the proper orientation of the material to obtain desired strength characteristics. The resin used in this process is preferably an elongation resin formed by mixing a desired amount of rigid and flexible polyester resins and catalyzing for cure with benzoyl-peroxide.

When the outermost layer 20 has been applied, the formation of the pipe is substantially complete. However, the resin, which is distributed between the fibers of each layer and between adjacent layers, is in an uncured state. To cure the resin and to bring the pipe to desired internal and external diameter, the pipe is directed through a heated mold 25. After the resin is cured, the rigid finished pipe is drawn off the lower end of the mandrel 12 by a pipe advancing mechanism 27. The pull exerted by the mechanism 27 is utilized to not only draw the finished pipe off the mandrel but also to progressively slide the layers of glass fiber material 10, 14, 16, 18 and 20 downwardly along the vertical mandrel 12 as the pipe is being developed.

The base layer 10 is formed by transversely folding a relatively wide ribbon 30 of resin-impregnated glass fiber matting and feeding the folded ribbon in a lengthwise direction into position around the mandrel 12, as seen in FIG. 2. The ribbon 30 is unwound from a supply spool 32 (FIG. 1) which is rotatably mounted on a stationary support member 34. After leaving the spool 32 the ribbon is directed, by means of guide rollers 35 and 36, through a bath 37 of liquid resin, over a roller 38 and through a stationary folding guide 39 (FIG. 2) onto the mandrel 12. The ribbon 30 may be equal in width to the circumference of the mandrel 12 so that a longitudinal butt joint is formed by the side edges of the ribbon, or if desired, the ribbon may be slightly wider so that an overlapping joint is formed. For certain pipes it has been found desirable to use two folding guides, the guides being disposed on opposite sides of the mandrel and each guide being adapted to fold a ribbon around a little more than half the mandrel to thereby form a base layer with two longitudinal overlapping seams.

The second layer 14 (FIG. 1) of glass fiber material is applied over the base layer 10 by means of a rotatable turret 41 on which a plurality of supply spools 42 are rotatably mounted. The turret 41 has a depending annular flange 43 disposed in sliding engagement in an annular groove 44 in a stationary support member 45. The turret and the support member 45 have aligned openings 46 and 47, respectively, through which the mandrel 12 extends, the longitudinal axis of the tubular mandrel 12 being located on the axis of rotation of the turret 41. A strand of glass fiber 49 is unwound from each spool 42, directed through a bath 50 of liquid resin in an open-top container 51 and applied to the base layer 10. Since, at this state in the formation of the pipe, the base layer 10 is being moved longitudinally along the surface of the mandrel 12 due to the pull of the pipe-advancing mechanism 27 on the finished portion of the pipe and, since the turret 41 is mounted in fixed position relative to the mandrel, the strands 49 of glass fiber will be wound spirally on the base layer 10 as the turret 41 is rotated.

The glass fiber strands, which form the third layer 16, are applied over the second layer 14 by a dispensing unit 54 which includes a stationary support member 55 on which a plurality of supply spools 56 is rotatably mounted. The support member 55 has an aperture 58 through which the mandrel 12 extends. A continuous strand 60 of glass fiber is unwound from each spool 56, directed through a bath 62 of liquid resin and then applied to the helical layer 14 with the fiber strands 60 disposed axially on the mandrel 12. The fiber strands 60 are guided onto the helical layer 14 by rounded upper edges formed around the aperture 58 of the stationary member 55.

Glass fiber strands, forming the fourth layer 18, are placed over the third layer 16 by a rotatable turret 64 on which a plurality of supply spools 66 is rotatably mounted. The turret 64 has a depending annular flange 68 disposed in sliding engagement in an annular groove 69 in a stationary support member 70. The turret 64 and the support member 70 have aligned openings 71 and 72, respectively, through which the mandrel 12 extends, the longitudinal axis of the mandrel being located on the axis of rotation of the turret 64. A continuous strand 73 of glass fiber is drawn from each spool 66, directed through a bath 74 of liquid resin and applied to the layer 16 in exactly the same manner as the strands 49 were applied to form the second layer 14. However, the turret 64 is arranged to rotate in a direction opposite to the direction of rotation of turret 41 and, accordingly, the strands 73 will be spiraled in a direction opposite to the direction of spiraling of the strands 49 of the second layer 14.

The outermost layer 20 of glass fiber strands is applied by a spool 76 that is rotatably mounted on a shaft 77 carried on a turret 78 that has a depending annular flange 79 slidably journalled in an annular groove 80 of a stationary support member 81, and has a central opening 82 aligned with an opening 83 in the support member 81. As the turret 78 is rotated, the spool 76 is carried in a circular path and a ribbon 84 of glass fiber mating is unwound from the spool and wrapped over the fourth layer 18 while all the previously formed layers are being moved longitudinally along the mandrel surface. The ribbon 84 is not impregnated with resin before it is applied over the layer 18, because at this point in the process an excess of resin is available on the surface of the layer 18 and, accordingly, the ribbon 84 will be saturated as soon as it is applied.

The turrets 41, 64 and 78 are rotated by means of a shaft 85 which is driven through meshing gears 86 from an electric motor 87. Each of the turrets 41, 64 and 78 is of circular configuration and has a pulley formed on its outer periphery. A belt 88 is trained around the pulley on turret 41 and around a pulley 89 keyed to the shaft 85, while a similar belt 90 is trained around a pulley formed on the turret 78 and around a pulley 91 keyed on the shaft 85. When the shaft 85 is rotated, the turrets 41 and 78 will be rotated in the same direction. A belt 92 is trained around the pulley formed on the turret 64 and around a pulley 94 keyed to a countershaft 95 which is driven through meshing gears 96 by the shaft 85. Therefore, when the shaft 85 is rotated, the turrets 41 and 78 will be rotated in one direction while the turret 64 will be rotated in an opposite direction about the mandrel 12.

The heated mold 25 comprises an elongated tubular member having three independent jacketed portions 97, 98 and 99 through which heating fluids of different temperatures may be circulated to effect a progressive curing of the resin as the pipe is pulled through the mold. The mandrel 12 extends through the mold 25 to a point a short distance below the lower end thereof. To aid in the curing of the resin, the mandrel 12 is equipped, at that portion of the mandrel that extends through the mold, with an internal heating means (not shown) which is heated in any suitable way, as by introducing a heating fluid through conduits 100 disposed inside the mandrel. Thus, the outside surface of the mandrel and the inside surface of the mold serve as platens which squeeze and exert a pressure on the pipe as the resin is cured to bring it to the desired inside diameter, outside diameter, and wall thickness.

The three jacketed portions 97, 98 and 99 of the mold define three curing zones. Zone A, disposed at jacketed portion 97, is maintained at about 110° F. At this zone, excess resin is squeezed from the pipe and entrapped air bubbles are displaced from the resin. Zone B, defined by jacketed portion 98, is a resin gelation zone and is maintained at about 200° F. Zone C, defined by jacketed portion 99, is maintained at about 250° F., a temperature sufficient to complete the curing of the resin.

As shown in the attached drawing, two spiral layers and one longitudinal layer of roving-type continuous glass fibers are applied over the base layer 10 in the desired orientation and with a sufficient number of fibers to give the required burst pressure resistance. For example, turret 41 may mount twenty spools of twenty-end roving and make one turn clockwise as the pipe in the formative stage advances two and a half inches along the axis of the mandrel. To make a four-inch diameter pipe, with the above stated conditions, the dispensing unit 54 would mount one hundred spools of twenty-end roving laid longitudinally on the first spiral layer. Turret 64 would be equipped with the same number of spools as turret 41. While two spiral layers of fibers separated by a longitudinal layer are illustrated, it is to be understood that additional longitudinal and spiral layers in any desired arrangement may be used depending upon the amount of bursting pressure and the amount of buckling stresses that must be resisted.

The illustrated arrangement, wherein oppositely wound helical layers are separated by an axial layer, provides a particularly strong and efficient pipe. The fibers in the helical layers resist pressure tending to burst the pipe, and the fibers in the axial layer resist the tendency of the pipe to bend or sag during operation. It will be recognized, of course, that the helical layers and the axial layers may be alternated. For example, a longitudinal layer could be applied to the mandrel first and then a helical layer applied thereover. Or, the base layer could be a helical layer having a lead such that the layer has the characteristics of both a helical winding and a longitudinal winding. The inner layer 10 and the outer layer 20 which are made of matting having a random fiber orientation provide a more or less smooth finished surface to the pipe which facilitates the sliding movement of the pipe through the forming apparatus and promotes the even distribution of the resin whereby a leak-proof pipe is obtained. However, these layers of matting may be eliminated if a smooth finish is not desired. The glass fiber roving used to form layers 14, 16 and 18 consists of substantially untwisted fibers. It will be understood that twisted fibers may be used if they have the necessary strength characteristics.

The pipe advancing mechanism 27 is shown as comprising an endless chain conveyor 102 having releasable clamps 104 for gripping the pipe and pulling it through the mold. Other standard pipe advancing mechanisms, such as feed rollers, may be employed.

From the foregoing description it will be apparent that the present invention provides a novel, efficient, continuous method of making reinforced plastic material, and especially reinforced plastic pipe. The plastic pipe produced according to the teaching of this invention is light in weight, corrosion, abrasion and rust resistant, and has sufficient strength to resist bursting and bending pressures.

Although a particular embodiment of the invention has been described in which continuous glass fibers are impregnated with a thermo-setting binder which is subsequnetly cured by the application of heat, it will be understood that the present novel method of making pipe can be carried out using a wide variety of fibrous fabrics and binders. While glass fibers inherenly possess many characteristics that are desirable in a plastic pipe, many other natural and synthetic fibers may be used, such as cotton or nylon fibers. Binders suitable for use with the above-mentioned fibrous fabrics may be selected from the various materials including thermo-setting and thermoplastic resinous materials, natural and synthetic rubbers and the constituents of cold and semi-hot molding compounds, such as oils and tars. If a binder is used that sets up when chilled, the heated mold 25 may be replaced by a suitable chilling mold. Such a chilling mold would be provided with sections, corresponding to the jacketed portions 97, 98 and 99, which could be maintained at different temperatures by the circulation therethrough of cooling fluid at different temperatures or in different quantities. As the pipe passes through the chilling mold, it would be progressively cooled until it became rigidly consolidated. It will, therefore, be apparent that the various physical characteristics may be varied in a pipe formed according to the present method merely by the proper selection of fibrous materials and adhesive binders.

Having thus described our invention, what we claim as new and desire to protect by Letters Patent is:

1. A method of forming a cylindrical plastic member comprising the steps of continuously folding a ribbon of resin-impregnated fiber matting in a transverse direction and continuously feeding said folded ribbon in a lengthwise direction into position around an upper portion of a vertical cylindrical mandrel to form a cylindrical base layer thereon, progressively sliding said base layer downwardly along said mandrel, positioning layers of helically wound resin-impregnated fiber strands and layers of axially oriented resin-impregnated fiber strands successively over said base layer to form an uncured cylindrical plastic member as said base layer is drawn downwardly, directing said uncured member through a curing zone, subjecting said member to heat having an intensity greater at the exit end of the zone than at the entrance end of the zone, and continuously withdrawing said member after being cured from said zone and from the lower end of said cylindrical mandrel.

2. A method of producing a cylindrical plastic member comprising the steps of continuously folding a ribbon of resin-impregnated glass fiber matting transversely around an upper portion of a stationary vertical cylindrical mandrel to form a cylindrical base layer thereon, progressively sliding said base layer downwardly along said mandrel, positioning layers of helically wound resin-impregnated glass fiber roving and layers of axially oriented resin-impregnated glass fiber roving over said base layer to form an uncured cylindrical plastic member as said base layer is drawn downwardly, directing said uncured member through a curing zone, subjecting the outer surface of said uncured member and the inner surface of said uncured member to separate sources of heat to simultaneously heat both surfaces, the intensity of each heat source being greater at the discharge end than at the entrance end of said curing zone, and continuously withdrawing said member after curing from said zone and from the lower end of said mandrel.

References Cited in the file of this patent
UNITED STATES PATENTS

| | | |
|---|---|---|
| 817,187 | Palmer et al. | Apr. 10, 1906 |
| 864,168 | Hinsky | Aug. 27, 1907 |
| 2,402,038 | Goldman et al. | June 11, 1946 |
| 2,422,234 | Goldman | June 17, 1947 |
| 2,502,638 | Becht | Apr. 4, 1950 |
| 2,594,838 | Alexander | Apr. 29, 1952 |
| 2,612,910 | Krupp | Oct. 7, 1952 |
| 2,614,058 | Francis | Oct. 14, 1952 |
| 2,653,887 | Slayter | Sept. 29, 1953 |
| 2,694,661 | Meyer | Nov. 16, 1954 |
| 2,714,414 | DeGanahl et al. | Aug. 2, 1955 |
| 2,723,705 | Collins | Nov. 15, 1955 |
| 2,731,070 | Meissner | Jan. 17, 1956 |
| 2,742,931 | DeGanahl | Apr. 24, 1956 |
| 2,760,549 | Nash et al. | Aug. 28, 1956 |